Figure 3:
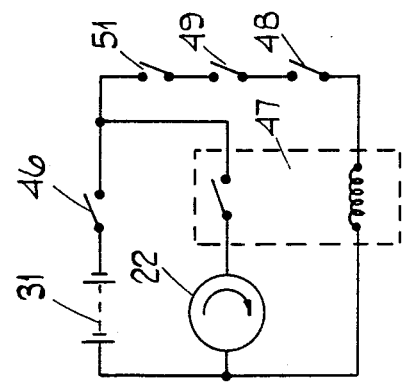

United States Patent [19]

Lewis et al.

[11] 4,044,852

[45] Aug. 30, 1977

[54] ELECTRICALLY ASSISTED CYCLE

[75] Inventors: Frank Lewis, Birmingham; Charles Patrick Duncan Davidson, Droitwich, both of England

[73] Assignee: Lucas Industries Limited, England

[21] Appl. No.: 650,876

[22] Filed: Jan. 21, 1976

[30] Foreign Application Priority Data

Jan. 21, 1975 United Kingdom ................ 2634/75
Feb. 7, 1975 United Kingdom ................ 5262/75

[51] Int. Cl.$^2$ ............................................. B62D 25/00
[52] U.S. Cl. .................................... 180/68.5; 70/258; 180/34; 180/65 R
[58] Field of Search ...................... 180/68.5, 34, 65 R; 70/233, 258

[56] References Cited

U.S. PATENT DOCUMENTS

| 1,577,292 | 3/1926 | Obreiter | 70/258 |
| 1,583,609 | 5/1926 | Sayers | 70/258 X |
| 2,213,010 | 8/1940 | MacPherson | 180/68.5 X |
| 2,397,115 | 3/1946 | Argyris | 180/34 |
| 2,504,265 | 4/1950 | Jozif | 180/68.5 |
| 2,544,590 | 3/1951 | Dyson | 70/233 |
| 2,876,857 | 3/1959 | Beyerstedt | 180/68.5 X |
| 3,372,768 | 3/1968 | Wresch | 180/34 |
| 3,827,519 | 8/1974 | Snider | 180/65 |
| 3,915,250 | 10/1975 | Laden | 180/34 |
| 3,934,669 | 1/1976 | Adams | 180/34 |

FOREIGN PATENT DOCUMENTS 977,503 11/1950 France .................... 180/34

Primary Examiner—Joseph F. Peters, Jr.
Assistant Examiner—Terrance L. Siemens
Attorney, Agent, or Firm—Holman & Stern

[57] ABSTRACT

A battery support for an electrically assisted cycle includes a box-like member which is arranged to be secured to alternatively to be incorporated into the frame of the cycle. The box-like member has an open face whereby an electric traction battery can be inserted into the member. A releasable retaining member is carried by the box-like member and has an operative position in which the retaining member extends over the open face of the box member so as to retain the battery therein in use. The electrically assisted cycle utilizing the battery support has the box-like member secured to or incorporated in the frame thereof and the battery carried by the box-like member is associated with an electric motor also carried by the frame of the cycle, electric motor being arranged to assist the rider in propelling the cycle.

18 Claims, 3 Drawing Figures

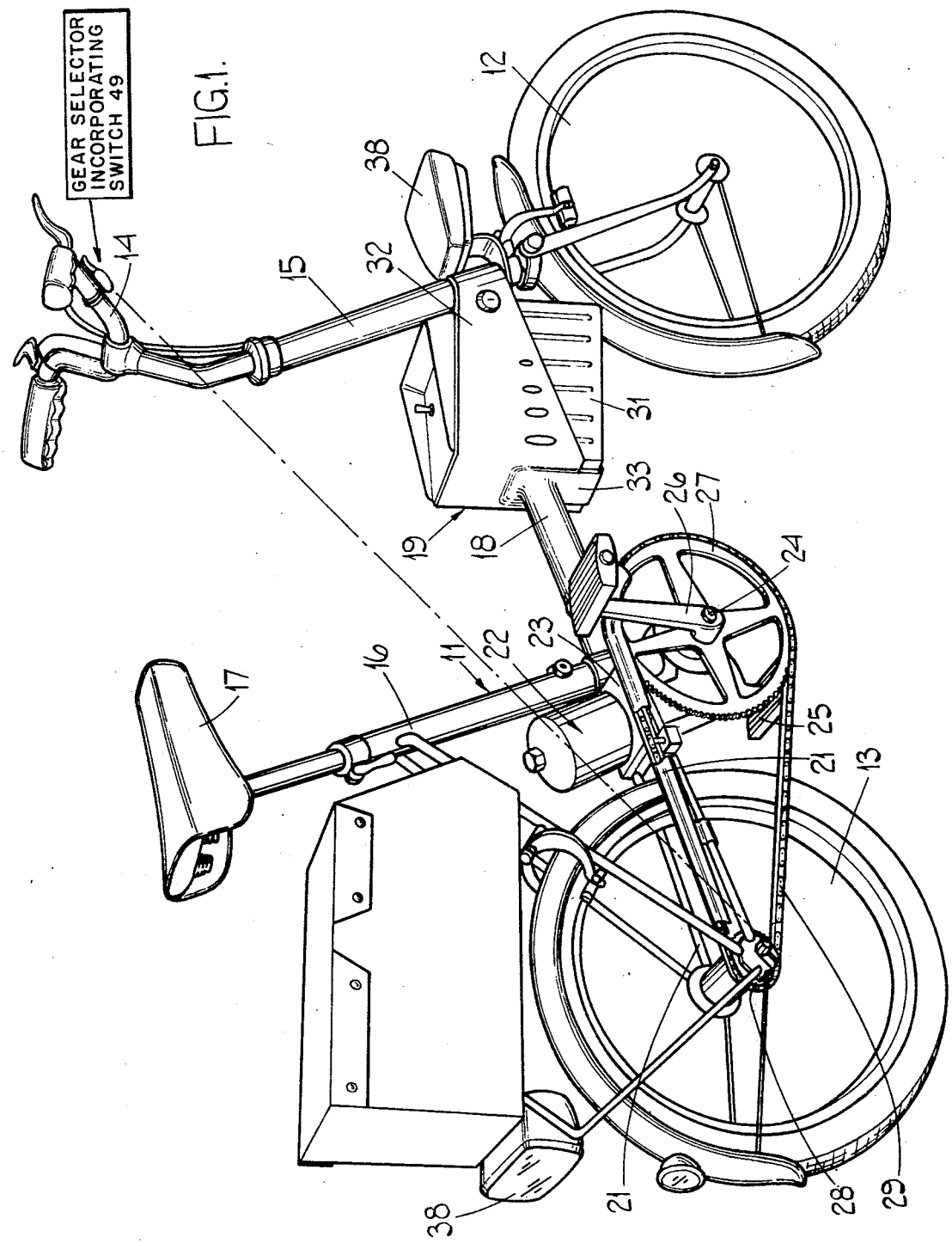

ELECTRICALLY ASSISTED CYCLE

This invention relates to an electrically assisted cycle, particularly but not exclusively a pedal bicycle.

An electrically assisted cycle according to the invention includes a frame, a ground engaging wheel, means rotatably mounting the ground engaging wheel on the frame, a rotatable drive member, means rotatably mounting the drive member on the frame, means whereby a rider of the cycle can rotate said rotatable drive member relative to the frame, an endless non-extensible flexible member coupling the drive member and the wheel whereby rotation of the drive member propels the cycle, an electric motor, means mounting the electric motor on the frame, a battery support including a box-like member secured to or incorporated in the frame, the box-like member being open at one face and receiving therein an electric storage battery, the battery support further including a releasable retaining member carried by the box-like member to retain the battery therein in use, said electric motor having an output member coupled to said ground engaging wheel whereby the motor can propel the cycle, means electrically connecting said electric storage battery to said electric motor, said means incorporating a first electrical switch whereby the electrical circuit between the motor and the battery can be made and broken, and, a key operated mechanism incorporating first locking means associated with said battery retaining member whereby said retaining member can be locked in said operative position so that the appropriate key is required to release the retaining member to remove the battery, and said key operated mechanism further including a latch bolt arranged to lock a movable part of the cycle against movement so as to inhibit unauthorised use of the cycle, said latch bolt being movable by operation of the appropriate key in said key operated mechansim.

Preferably, said first electrical switch is incorporated in said key operated latch mechanism so that said switch is operated by rotation of the appropriate key.

Conveniently, said latch bolt is arranged to lock a steering shaft of the cycle, to prevent steering movement thereof, in a position relative to the cycle frame such that the rotational axis of the steered wheel is not transverse to the plane of the cycle frame so that the cycle cannot readily be moved in a straight course with the steered wheel in contact with the ground.

Desirably, said box like member of said battery support has its lower face open to permit insertion of an electric storage battery, and said releasable retaining member in use supports the weight of the battery.

Desirably, the box like member carries a control panel carrying an electrical switch for controlling lights carried by the frame of the cycle.

Preferably, the box like member of the battery support carries a battery charger coupled to said battery.

Conveniently, said box like member of said battery support carries auxilliary batteries associated with lights carried by the frame of the cycle.

Preferably, the electric motor is coupled to the ground engaging wheel by way of said rotatably drive member and said endless flexible member.

Conveniently, the motor is carried by a casing secured to, or forming part of, the frame of the cycle, the casing rotatably supporting a shaft extending transversely of the frame of the cycle and the output member of the motor being coupled to the shaft by way of a gear mechanism within the casing so that the motor can drive said shaft, said rotatable drive member being carried by said shaft for rotation therewith.

Conveniently, a freewheel mechanism is incorporated between said motor and said drive member whereby the drive member can overrun the motor so that when the drive member is rotated by the rider of the cycle the rider does not have to overcome the resistance to rotation of the motor.

Desirably, said freewheel mechanism is housed within said casing, and is operative between said gear mechanism and said shaft.

Preferably, the cycle incorporates a manually operable electrical switch controlling energisation of said motor.

Conveniently, said manually operable switch is supported by the handlebars of the frame of the cycle.

Desirably, said manually operable switch is resiliently biased to a condition in which the motor is not energised so that the rider of the cycle must hold the switch against its resilient bias to maintain the motor energised.

Conveniently, said manually operable switch has a rotatable operating member.

Alternatively, said manually operable switch has an operating member which is moved to operate the switch by the rider gripping the handlebars of the cycle.

Preferably, the ground engaging wheel includes a hub gear mechanism of the kind which requires the input member thereof not to be subject to driving force during gear change operations, and the manually operable gear selector associated with the hub gear mechanism includes switch means operable automatically during gear change operations to de-energise the motor.

Desirably, the cycle is provided with further switch means operable by the application of driving force by the rider of the cycle to permit energisation of the motor, so that the cycle cannot be propelled by the motor alone.

Figure 2:
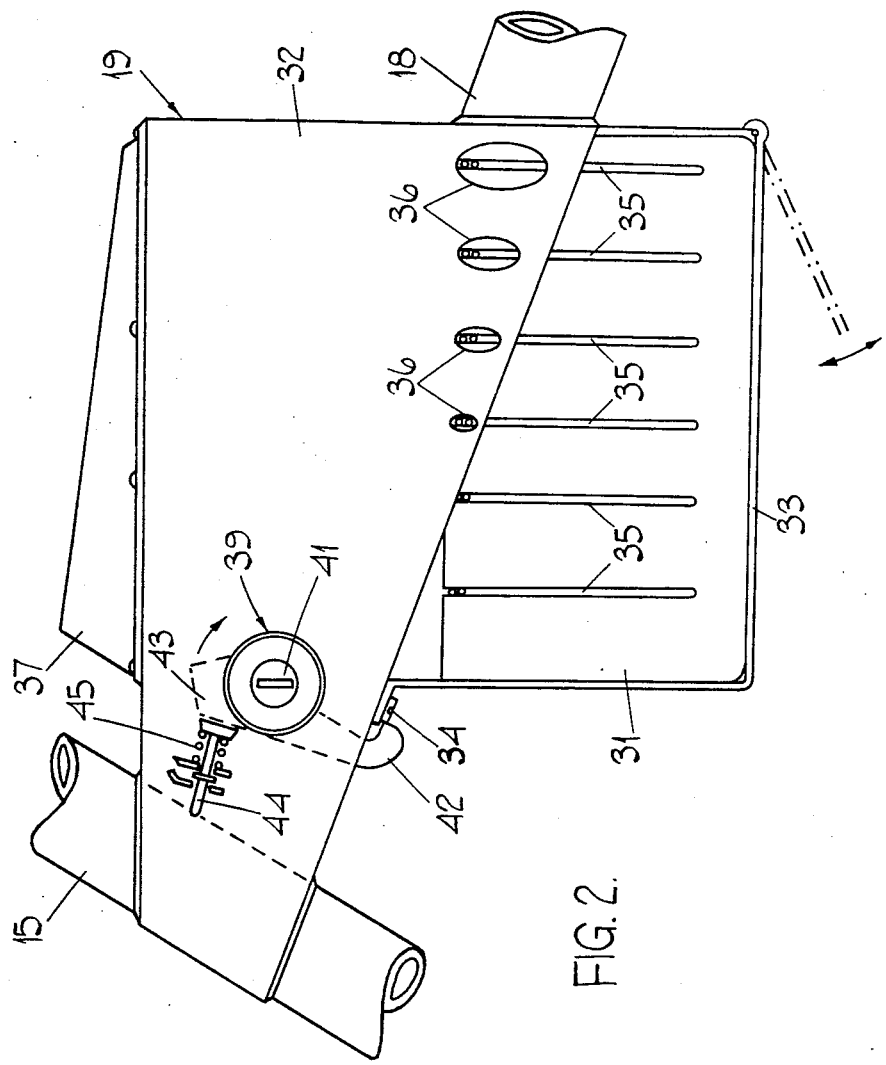

One example of the invention is illustrated in the accompanying drawings wherein, FIG. 1 is a perspective view of an bicycle, FIG. 2 is a side elevational view, to an enlarged scale of the battery support of the bicycle, and FIG. 3 is a circuit diagram of the electrical system of the bicycle.

Referring to the drawings, the bicycle includes a frame 11 formed for the most part from steel tube. The frame 11 rotatably supports first and second ground engaging wheels 12, 13 the wheel 12 being steerable by means of the handlebars 14 of the frame 11, and the wheel 13 being a driving wheel. The frame 11 includes a first upright tube member 15 rotatably mounting the handlebars 14 and wheel 12 and a second upright tube member 16 carrying at its uppermost end the saddle 17 of the bicycle. The tube members 15, 16 are interconnected by a tube member 18 incorporating a battery support 19. It is to be understood that the battery support 19 need not be an integral part of the frame, and could merely by carried thereby. However, in the bicycle shown in FIG. 1 the battery support 19 is a structural part of the frame of the bicycle 11.

Extending rearwardly from the junction of the tube members 16, 18 are a pair of tube members 21 supporting the driving wheel 13.

Adjacent the junction of the tube members 16, 18, and 21 and clamped to the tube members 21 is the casing 23 of an electric motor unit 22. Although clamped to the tube members 21 the casing 23 constitutes part of the frame 11 in that it receives, and is secured to the lower end of the tube member 16, and carries the pedal assembly of the bicycle. Extending upwardly from the casing 23 to the rear of the tube member 16 is an electric motor the output member of which is a worm gear extending into the casing 23. The worm gear meshes, within the casing 23, with a pinion gear wheel the pinion gear wheel having its axis of rotation extending transversely of the frame 11. The pinion gear wheel is mounted on a shaft 24 which is supported for rotation in the casing 23, and which extends transversely of the frame 11, opposite axial ends of the shaft 24 projecting from the casing 23 on opposite sides of the frame 11. A freewheel mechanism couples the pinion gear wheel to the shaft 24 so that the pinion gear wheel can rotate the shaft 24 in one direction, but will slip relative to the shaft 24 in the opposite direction.

At one end of the shaft 24 is mounted a first pedal assembly 25, while at the opposite end of the shaft 24 is mounted a second pedal assembly 26. The pedal assemblies are as usual disposed at 180° with respect to one another around the axis of the shaft 24 and are clamped to the shaft 24 to rotate therewith. The pedal assembly 26 incorporates a chain wheel 27, the chain wheel 27 being coupled to a sprocket 28 carried by the wheel 14, by means of an endless flexible, non-extensible chain 29. The driving wheel 13 incorporates a hub gear mechanism of which the sprocket 28 is the input member. It will be understood that the cycle can be propelled by the rider using the pedals 25, 26 in the normal manner, and during such movement the freewheel between the shaft 24 and the pinion gear wheel slips so that the rider does not have to overcome the resistance to rotation of the motor 22. Furthermore, it will be recognised that when the motor 22 is energised then the shaft 24 and therefore the chain wheel 27 will be rotated by the motor.

An electric traction battery 31 is carried by the battery support 19, the battery support 19 including a box-like member 32 open at its lower face to permit upward insertion of the battery 31 into the battery support 19. The battery support further includes a retaining strap 33 pivotally connected at one end to the box-like member 32 and extending beneath the battery 31. At its end remote from its pivotal connection to the box-like member 32 the strap 33 is secured by means of a screw 34 to the box-like member 32 and so supports the weight of the battery 31.

The battery 31 is a 12 volt lead acid accumulator, and is formed with a transparent outer case divided internally into six cells. Associated with each cell is a channel 35 in the wall of the battery case, and within each channel are a series of coloured beads which float at levels within their vertically extending channels dependent upon the state of charge of their respective battery cell. Some of the cells of the battery have their channels partially obscured by the box-like member 32, and for this, and stylistic reasons, the box-like region 32 is pierced with apertures 36 whereby the battery charge indicators of the obscured cells can be seen.

The uppermost surface of the box-like member 32 carries a control panel 37 secured to the box-like member 32 by screws. The control panel 37 carries manually operable switches associated with the lights 38 of the bicycle and additionally carries electrical connector sockets electrically connected to a battery charger housed between the control panel 37 and the top of the battery 31. The battery charger is electrically connected to the terminals of the battery 31 either automatically upon insertion of the battery 31, by way of plug and socket connectors within the box-like member 32, or alternatively by way of extended leads whereby the battery can be removed from the box-like component 32 sufficiently far to render the connections accessible. The remaining electrical connections from the battery to the various switches and the motor of the bicycle are made in similar manner to either of the above methods.

It is found that when the battery 31 is supplying power to the motor unit 22 the lights 38 of the bicycle can be dimmed. In order to maintain the brightness of the lamps 38 small, rechargeable, auxiliary cells are housed within the box-like member 32 and are arranged to be charged by the battery charger of the battery 31, simultaneously therewith. The auxiliary batteries are charged by way of a diode which prevents discharge of the auxiliary batteries through the motor 22. Thus the auxiliary batteries supply the lights, but not the drive unit of the cycle.

Housed within the box-like member 32 and accessible from the exterior thereof is a key-operated mechanism which serves a number of functions. The key-operated mechanism 39 is of the cylinder lock type, and the key can be inserted into the rotatable barrel of the cylinder lock at the exterior of the box-like member 32, and rotation of the barrel of the lock operates three functions simultaneously. Firstly, rotatable with the barrel 41 of the lock is a latch member 42 which, in its operative position, overlies the free end of the strap 33 to prevent movement of the strap 33 relative to the box-like member 32 even if the screw 34 is removed. Thus, the key must be inserted into the barrel 41 and the barrel 41 rotated to release the latch member 42 from the strap 33 before the battery can be removed. The rider will maintain possession of the key, and so when he parks the cycle he will leave the latch member 42 in its operative position, and remove the key so that the battery 31 cannot be removed without using the appropriate key. At its innermost end the latch member 42 includes a cam 43 associated with a spring-loaded latch bolt 44. The spring-loaded latch bolt 44 is slidably mounted within the box like member 32 and is movable, against its spring bias, to a position wherein the bolt 44 extends through an aperture in the tube 15, and into an aperture in the rotatable steering shaft which passes through the tube member 15 linking the front wheel assembly and the handlebars 14. It will be understood that when the latch bolt 44 is in an operative position it prevents rotation of the steering shaft, and therefore locks the steering of the bicycle rendering the bicycle unridable. The bolt 44 is held in its operative position against the action of its spring bias, by the cam 43 when the latch member 42 is in its operative position. Thus when the rider leaves the cycle taking the key with him, not only is the battery 31 locked in position, but the steering of the bicycle is also locked. When the rider wishes to use the bicycle he uses the key to move the latch member 42 to its inoperative poosition but of course the strap 33 is still held in position by the screw 34. Movement of the latch member 42 to its inoperative positon permits the bolt 44 to be withdrawn from the steering shaft by its spring bias. The spring bias is conveniently achieved by a compression spring 45 encircling the bolt and acting between a head on the bolt and a fixed abutment on the box like member 32.

The aperture in the steering shaft into which the latch bolt 44 extends in its operative position is so positioned around the circumference of the steering shaft that in order to align the aperture in the steering shaft with the aperture in the frame tube 15 the steering shaft must be rotated to a position wherein the rotational axis of the steering wheel lies in the plane of the frame, so that the plane of the wheel is generally as right angles, to the plane of the frame. Thus when the latch bolt 44 is operative, locking the steering shaft then the steerable shaft is locked in a position where the steerable wheel of the cycle extends transverse to the frame of the cycle and the cycle cannot therefore be moved in a straight line while maintaining the wheel in contact with the ground.

It will be understood that the locking of the steering shaft in a position where the rotational axis of the wheel is other than transverse to the frame is a greater deterrent to unauthorised removal of the bicycle than would be locking of the shaft in a position where the rotational axis of the wheel is transverse to the frame. In both case of course the cycle is unridable since no steering action can take place, but in the latter case the cycle can be wheeled away in a straight course, whereas in the former case the cycle must be completely or partially carried.

It is to be understood that while it is preferred to lock the steering shaft in a position where the steerable wheel is transverse to the frame other angular orientations of the wheel relative to the frame, in which the cycle cannot be wheeled away in a straight line, are possible.

Also operated by rotation of the barrel 41 is an electrical switch connected in series with the battery 31. The electrical switch 46 (FIG. 3) is a battery isolating switch, and when open isolates the battery 31 from the remaining circuits of the bicycle. The switch 46 is arranged to be in its open condition when the latch member 42 is in its operative position. Rotation of the barrel 41 of the lock to release the latch member 42 and permit the bolt 44 to be withdrawn moves the switch 46 to a closed condition wherein the battery 31 is no longer isolated from the remaining electrical circuits of the bicycle. Thus, the threefold function of the key operated mechanism is to permit the bicycle to be parked, with the rider taking the key with him, in a condition where the battery 31 cannot be removed, the steering of the bicycle cannot be operated and the motor 22 of the bicycle cannot be energised. Insertion of the key into the barrel 41, and subsequent rotation of the barrel 41 thus places the bicycle in a condition ready for operation.

In order to effect the control of energisation of the motor unit 22 in use of the bicycle several switches are provided. The motor 22 draws a relatively high current when operating, and in preference to the operating current of the motor flowing through several switches, a relay is utilised, the contacts of which are well capable of carrying the motor current. The relay 47 is shown in FIG. 3 and three electrical switches are connected in series with one another and the operating coil of the relay. The first switch 48 is a manual control switch mounted on the handlebars of the bicycle. The control switch 48 is a normally open switch, and thus in its rest condition breaks the circuit of the relay 47 so that the relay contacts are open and the motor is not energised. Ignoring for the moment the other switches in series with the switch 48, then when the switch 48 is closed the relay 47 is energised and the relay contacts close energising the motor 22. The switch 48 can take a number of forms. For example, the switch can be a twist grip switch similar to the throttle control of a motor cycle, the rider of the bicycle being required to twist one of the grips on the handlebars 14 to close the switch 48, and the twist grip being spring urged back to its rest position where the switch 48 is open. Alternatively, the switch can be a press switch incorporated in one of the grips of the handlebars 14, the switch being closed by the rider gripping the handlebars in the manner normal to a rider of a bicycle. Where the switch 48 is a press switch then preferably, the region of the grip which must be pressed to close the switch 48 lies beneath one of the hand operated brake controls on the handlebar so that when the rider operates the hand brake control in the normal manner he will release his grip on the switch so that the switch restores to its open position. It follows therefore that with this type of switch the motor 22 will not be energised while the rider is applying the brake.

It will be recalled that the sprocket 28 is the input member of a hub gear mechanism. Where the hub gear mechanism of the type which requires the input member 28 not to be subject to a driving force during gear change operations, then it will be recognised that the motor 22 must not be driving the sprocket 28 when a gear change is made. This of course can be achieved by the rider merely releasing the manual control switch 48 while operating the gear selector carried by the handlebars 14. However, such an operation requires the rider of the cycle to perform two separate functions simultaneously, while at the same time maintaining full control of the cycle. Thus in order to remove this requirement a switch 49 is incorporated into the gear selector mechanism carried by the handlebars of the cycle. The gear selector mechanism includes a detent arrangement for retaining the lever of the selector in any one of a number of predetermined positions corresponding to different gear settings of the hub gear mechanism. During a gear change operation part of the detent member is moved from a rest position which it occupies in any of the predetermined positions of the lever.

This movement of the detent member is utilised to operate the switch 49 to open the switch 49. Thus the switch 49 is a normally closed switch and occupies its closed position in any one of the predetermined positions of the gear selector lever. However, during movement of the gear selector lever between its predetermined position, to effect a gear change, the switch 49 is opened and so breaks the circuit of the relay 47 de-energising the motor 22. It will be understood therefore that the operation of the switch 49 is automatic as a gear change is made. In a modification the switch 49 is a normally open switch and closure of the switch during a gear change mechanism is used to de-energise the relay 47. For example, the normally open switch could be in parallel with the coil of the relay 47 so that closure of the switch short circuits the coil of the relay causing the relay to be de-energised.

It is desired that the bicycle should not be capable of being powered solely by the motor 22, and that the motor 22 should only be capable of use to assist the rider in propelling the bicycle. In order to accomplish this desideratum, the electrical circuit includes a further normally open switch 51 controlling energisation of the coil of the relay 47. The switch 51 is moved to its closed condition by rider of the cycle applying driving force by way of the pedals 25, 26. Should the rider cease to apply driving force then the switch 51 will open, breaking the circuit of the relay, and de-energising the motor 22. The switch 51 can take a number of forms. For example, the switch 51 can be moved to its closed position by tension in the upper run of the chain 29. It is realised that when the motor 22 is operating then tension in the upper run of the chain is maintained by the motor 22. However, it is found that the switch 51 sensitive to tension in the upper run of the chain will not be maintained in its closed position merely by the tension generated by the motor 22. Thus either immmediately the rider ceases to apply driving force by way of the pedals, or fractionally thereafter the switch 51 is found to move to its open condition breaking the motor circuit. Thereafter of course it is necessary for the rider to apply driving force by way of the pedals to close the switch 51.

In an alternative arrangement, the switch 51 is incorporated into the pedal assembly, and is operated, that is to say moved to its closed condition by the take up of a very small degree of lost motion introduced between one of the pedal assemblies and the chain wheel 27. This small degree of lost motion is of course taken by immediately the rider starts to apply driving force by way of the pedals, and conveniently the switch 51 is incorporated in the connection of the pedal assembly 25 to the shaft 24 the small degree of lost motion being introduced between the pedal assembly 25 and the shaft 24. The degree of lost motion is sufficiently small that it is not noticeable to the rider of the cycle. It will be understood that the driving stroke of each pedal is approximately 180° of rotation of the shaft 24 from the top dead centre position of the pedal to its bottom dead centre position. Thus, it is conceivable that the switch 51 when incorporated into a pedal assembly, will be permitted to move to its open condition during the return movement of the pedal from bottom dead centre. In order to minimize the risk that the motor 22 will be de-energised during this movement several alternatives are possible. For example, the switch could be associated with a simple time delay circuit which maintains the circuit of the relay 47 for a sufficient time after the switch 51 has opened for the pedal to return to its dead centre position whereupon the switch will be closed again. Alternatively the pedal assembly 26 could have a similar switch associated therewith, the two switches being in parallel so that at any given time, one of the two switches will be closed provided the rider is applying driving force by way of the pedals.

As an additional anti-theft precaution, the frame tube 16 can incorporate, ajacent the motor unit 22, a key operated locking bolt which when operative prevents rotation of the pedal shaft 24. The key to operate the pedal shaft locking bolt could conveniently be the same key which operates the key operated mechanism 39.

We claim:

1. An electrically assisted cycle including a frame, a ground engaging wheel, means rotatably mounting the ground engaging wheel on the frame, a rotatable drive member, means rotatably mounting the drive member on the frame, means whereby a rider of the cycle can rotate said rotatable drive member relative to the frame, an endless non-extensible flexible member coupling the drive member and the wheel whereby rotation of the drive member propels the cycle, an electric motor, means mounting the electric motor on the frame, a battery support including a box-like member secured to or incorporated in the frame, the box-like member being open at one face and receiving therein an electric storage battery, the battery support further including a releasable retaining member carried by the box-like member to retain the battery therein in use, said electric motor having an output member coupled to said ground engaging wheel whereby the motor can propel the cycle, means electrically connected said electric storage battery to said electric motor said means incorporating a first electrical switch whereby the electrical circuit between the motor and the battery can be made and broken, and, a key operated mechanism incorporating first locking means associated with said battery retaining member whereby said retaining member can be locked in said operative position so that the appropriate key is required to release the retaining member to remove the battery, and said key operated mechanism further including a latch bolt arranged to lock a movable part of the cycle against movement so as to inhibit unauthorised use of the cycle, said latch bolt being movable by operation of the appropriate key in said key operated mechanism.

2. A cycle as claimed in claim 1 wherein a single operation of said key operated mechanism locks both said movable part of the cycle and the battery retaining member.

3. A cycle as claimed in claim 1 wherein said first electrical switch is incorporated in said key operated latch mechanism so that said switch is operated by rotation of the appropriate key.

4. A cycle as claimed in claim 1 wherein said latch belt is arranged to lock a steering shaft of the cycle to prevent steering movement thereof, in a position relative to the cycle frame such that the rotational axis of the steering wheel is not transverse to the plane of the cycle frame so that the cycle cannot readily be moved in a straight course with the steered wheel in contact with the ground.

5. A cycle as claimed in claim 1 wherein said box-like member of said battery support has its lower face open to permit insertion of an electric storage battery, and said releasable retaining member in use supports the weight of the battery.

6. A cycle as claimed in claim 1 wherein the box-like member carries a control panel carrying an electrical switch for controlling lights carried by the frame of the cycle.

7. A cycle as claimed in claim 1 wherein the box-like member of said battery support carries auxiliary batteries associated with lights carried by the frame of the cycle.

8. A cycle as claimed in claim 1 wherein the electric motor is coupled to the ground engaging wheel by way of said rotatable drive member and said endless flexible member.

9. A cycle as claimed in claim 1 wherein the motor is carried by a casing secured to or forming part of the frame of the cycle the casing rotatably supporting a shaft extending transversely of the frame of the cycle and the output member of the motor being coupled to the shaft by way of a gear mechanism within the casing so that the motor can drive said shaft, said rotatable drive member being carried by said shaft for rotation therewith.

10. A cycle as claimed in claim 1 wherein a freewheel mechanism is incorporated between said motor and said drive member whereby the drive member can overrun the motor so that when the drive member is rotated by the rider of the cycle the rider does not have to overcome the resistance to rotation of the motor.

11. A cycle as claimed in claim 10 wherein said freewheel mechanism is housed within said casing, and is operative between said gear mechanism and said shaft.

12. A cycle as claimed in claim 1 incorporating a manually operable electric switch controlling energisation of the said motor.

13. A cycle as claimed in claim 1 wherein said manually operable switch is resiliently biased to a condition in which the motor is not energised so that the rider of the cycle must hold the switch against its resilient bias to maintain the motor energised.

14. A cycle as claimed in claim 12 wherein said manually operable switch has a rotatable operating member.

15. A cycle as claimed in claim 12 wherein said manually operable switch is supported by the handlebars of the frame of the cycle.

16. A cycle as claimed in claim 12 wherein said manually operable switch has an operating member which is moved to operate the switch by the rider gripping the handlebars of the cycle.

17. A cycle as claimed in claim 1 wherein the ground engaging wheel includes a hub gear mechanism of the kind which requires the input member thereof not be subject to driving force during gear change operations, and the manually operable gear associated with the hub gear mechanism includes switch means operable automatically during gear change operations to de-engerise the motor.

18. A cycle as claimed in claim 1 including further switch means operable by the application of driving force by the rider of the cycle to permit energisation of the motor so that the cycle cannot be propelled by the motor alone.

* * * * *